US012226038B2

(12) United States Patent
Wicken et al.

(10) Patent No.: US 12,226,038 B2
(45) Date of Patent: Feb. 18, 2025

(54) DISPLAY AND METHODS OF USE THEREOF

(71) Applicant: Balloon Innovations, Inc., Westminster, CO (US)

(72) Inventors: Christopher J. Wicken, Golden, CO (US); Alex J. Fountain, Evergreen, CO (US)

(73) Assignee: Balloon Innovations, Inc., Westminster, CO (US)

( * ) Notice: Subject to any disclaimer, the term of this patent is extended or adjusted under 35 U.S.C. 154(b) by 187 days.

(21) Appl. No.: 18/111,345

(22) Filed: Feb. 17, 2023

(65) Prior Publication Data

US 2023/0255385 A1 Aug. 17, 2023

Related U.S. Application Data

(60) Provisional application No. 63/311,388, filed on Feb. 17, 2022.

(51) Int. Cl.

| | |
|---|---|
| ***F21S 4/00*** | (2016.01) |
| ***A47G 33/08*** | (2006.01) |
| ***B60Q 1/00*** | (2006.01) |
| ***F21S 9/03*** | (2006.01) |
| ***F21V 3/02*** | (2006.01) |
| ***F21V 23/00*** | (2015.01) |
| *F21W 121/00* | (2006.01) |
| *F21Y 115/10* | (2016.01) |

(52) U.S. Cl.

CPC .............. *A47G 33/08* (2013.01); *F21S 9/035* (2013.01); *F21V 3/026* (2013.01); *F21V 23/004* (2013.01); *A47G 2033/0827* (2013.01); *F21W 2121/00* (2013.01); *F21Y 2115/10* (2016.08)

(58) Field of Classification Search

CPC ............ A63H 2027/1058; A63H 27/10; A63H 2027/1075; F21S 4/10; F21S 9/02; F21V 3/023; F21V 3/026; F21V 23/06; A47G 33/08; A47G 2033/0827

See application file for complete search history.

(56) References Cited

U.S. PATENT DOCUMENTS

| | | | | |
|---|---|---|---|---|
| 4,934,986 | A * | 6/1990 | Wallace | A63H 27/10 446/222 |
| 7,344,267 | B2 * | 3/2008 | Carito | A63H 27/10 362/205 |
| 8,292,454 | B2 * | 10/2012 | Schrimmer | A63H 27/10 362/195 |
| 8,462,079 | B2 * | 6/2013 | Piccionelli | H04W 84/18 345/3.1 |
| 9,132,595 | B1 | 9/2015 | Wicken et al. | |
| 9,498,734 | B2 * | 11/2016 | Bo | A63H 27/10 |
| 10,814,239 | B1 * | 10/2020 | Allard | A63H 27/10 |
| 10,945,319 | B1 * | 3/2021 | McRae | H05B 45/30 |
| 11,019,706 | B1 * | 5/2021 | McRae | H05B 45/20 |

(Continued)

*Primary Examiner* — Shin H Kim

(74) *Attorney, Agent, or Firm* — Berg Hill Greenleaf Ruscitti LLP

(57) ABSTRACT

The present invention includes a novel illuminated ornamental display, and in particular a helium-free balloon coupled with an a externally mounted lighting assembly. In this preferred embodiment, the helium-free balloon and lighting assembly provide the appearance of a holiday ornament, and in particular a hanging Christmas tree ball ornament.

20 Claims, 11 Drawing Sheets

(56) References Cited

U.S. PATENT DOCUMENTS

| | | | | |
|---|---|---|---|---|
| 11,287,103 | B2 * | 3/2022 | Palumbo | F21V 3/026 |
| 11,291,099 | B2 * | 3/2022 | Piccionelli | G10L 17/22 |
| 11,466,822 | B1 * | 10/2022 | Xia | F21V 23/0435 |
| 11,484,808 | B2 * | 11/2022 | Moore | A63H 27/10 |
| 11,649,956 | B2 * | 5/2023 | Hetzroni | F21S 10/023 362/394 |
| 11,833,440 | B2 * | 12/2023 | Moore | F21V 3/026 |
| 2005/0281056 | A1 * | 12/2005 | Loomis | A47G 33/0836 362/653 |
| 2009/0067154 | A1 * | 3/2009 | Carito | A63H 27/10 362/96 |
| 2009/0085487 | A1 * | 4/2009 | Braasch | F21S 4/10 315/185 S |
| 2010/0226617 | A1 * | 9/2010 | Piccionelli | H05B 39/085 345/2.1 |
| 2014/0340903 | A1 * | 11/2014 | Mahr | F21V 23/001 362/249.08 |
| 2017/0028658 | A1 | 2/2017 | Wicken et al. | |
| 2018/0202619 | A1 * | 7/2018 | Dedene | F21V 23/06 |
| 2021/0283520 | A1 | 9/2021 | Moore et al. | |
| 2021/0361105 | A1 * | 11/2021 | Piccionelli | H04W 84/18 |
| 2022/0218139 | A1 * | 7/2022 | Piccionelli | H05B 47/175 |
| 2023/0255385 | A1 * | 8/2023 | Wicken | F21V 23/004 40/442 |

* cited by examiner

DISPLAY AND METHODS OF USE THEREOF

CROSS-REFERENCE TO RELATED APPLICATION

This application claims the benefit of and priority to U.S. Provisional Application No. 63/311,388, filed Feb. 17, 2022. The entire specification and figures of the above-referenced application are hereby incorporated, in their entirety by reference.

TECHNICAL FIELD

The present invention generally related to electrically-powered devices, and in particular an improved wired, and solar-powered ornamental display devices having externally-mounted lighting assemblies.

BACKGROUND

Traditional ornaments may be used during holiday seasons, special occasions, or everyday displays, to decorate trees, bushes, and other outdoor items. Moreover, traditional ornamental displays can be used for marketing and advertising purposes to attract consumer attention or to promote sales and other promotional activities or events. For example, traditional holiday ornaments, such as "Christmas bubbles" or "Christmas balls" are decorations that are usually made of blown glass, metal, wood, blown plastics, expanded polystyrene or ceramics and are typically used to decorate a Christmas tree or string together in series with a string or other similar support. However, such traditional ornamental displays are commercially limited. For example, traditional Christmas ball ornaments are generally small, being approximately 2-5 inches in diameter. As a result, such ornaments are generally not large enough to comprise stand-along displays that can independently attract consumer attention. Moreover, traditional ornaments are typically fragile and prone to break over time, and as such, are difficult to store and reuse for multiple occasions. Finally, small-traditional ornaments are difficult to individually illuminate, such that they are typically displayed with independent lights limiting their independent visual appeal.

Prior attempts to address these issues have resulted in limited success. For example, U.S. Application No. 20210283520 describes an inflatable ornamental design configured to be illuminated by a single light source from the inside of the device. However, placement of the lighting device inside the inflatable ornament does not sufficiently illuminate the device as intended. Specifically, being placed internally, the light must be able to fit through a small opening in the inflatable device. Such small lights, even LEDs, are not sufficient to illuminate the inflatable apparatus. Moreover, such small lights cannot diffuse through the surface material of the inflatable ball being positioned at too far of a distance. As a result, any translucent inflatable ball would show a bright, non-diffused point of light, while use of a less or non-translucent ornament would not allow any diffuse lighting to escape the device defeating the purpose of the ornament entirely.

As such, there exists a need for an improved ornamental display system that overcomes the limitations of the traditional displays described above. In particular, there exists a need for a novel ornamental display that is both large enough to act as a consumer attraction, while being constructed of material sufficiently rugged to allow for indoor as well as outdoor without the fear of breaking. This novel ornamental display requires the ability to be independently illuminated allowing it to be deployed in multiple locations without the need for a wired power source.

SUMMARY OF THE INVENTION

One aspect of the present invention relates to an improved outdoor solar powered ornamental display. In one preferred aspect, the ornamental display includes the general appearance of a holiday ornament, such as a "Christmas Ball" ornament. In a preferred aspect, the ornamental display can be disassembled and packaged for easy shipping and/or storage. and reassembled at a later date without significant risk of component failure.

Another aspect of the present invention includes a novel lighted ornamental display, and in particular an externally illuminated ornamental display. In one preferred aspect, the lighted ornamental display of the invention may include a novel solar-powered illuminated ornamental display, and in particular an externally illuminated solar-powered ornamental display.

Another aspect of the present invention includes a novel solar-powered illuminated ornamental display, and in particular a helium-free balloon coupled with an externally mounted solar-powered lighting assembly. In this preferred embodiment, the helium-free balloon and lighting assembly provide the appearance of a holiday ornament, and in particular a hanging Christmas tree ball ornament.

Another aspect of the invention may include an ornamental display assembly including a novel illuminated ornamental display, and in particular a helium-free balloon configured to be responsive to a power source, such as a wired outlet.

Another aspect of the present invention includes a display anchor assembly (23) configured to secure a novel lighted ornamental display, and in particular an externally illuminated ornamental display. In one preferred aspect, the lighted ornamental display of the invention may include a novel solar-powered illuminated ornamental display, and in particular an externally illuminated solar-powered or wired ornamental display secured to an external surface by a display anchor assembly.

Additional aspects will become apparent to one of ordinary skill in the art based on the figures, specification, and claims provided herein.

DETAILED DESCRIPTION OF THE INVENTION

Figure 1:
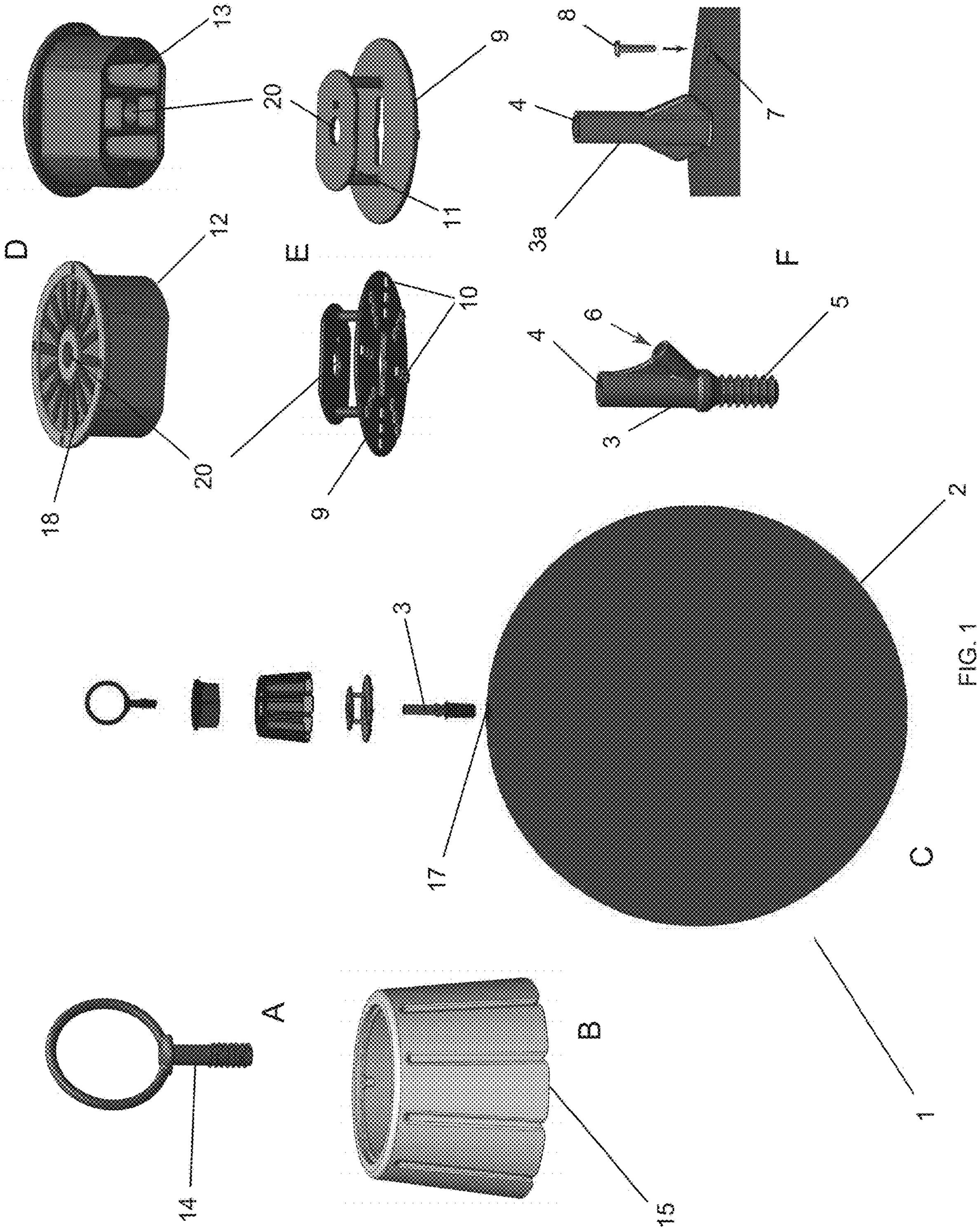
FIGS. 1A-F: shows a blown-up view of an ornamental display system in one embodiment thereof.

The present invention includes a novel ornamental display system (1). Generally referring to FIG. 1, the ornamental display system (1) of the invention may include a display (2), which in one preferred embodiment may include a helium-free balloon display. In this embodiment, a helium-free balloon display may include a generally spherical, or shaped form made from polyurethane (PU) and/or thermoplastic polyurethane (TPU), vinyl, flexible or polyvinylchloride (PVC), plastic, or other composite material that can be inflated with conventional air through a compressor or pump. Examples of helium-free balloon displays, and their methods of manufacture have previously been described in the art by Wicken et al, in U.S. Pat. No. 9,132,595B and US20170028658, both of which are incorporated herein by reference. As noted below, in certain embodiments, the balloon display (2) of the invention may be manufactured of a translucent, or semi-translucent material such that light from one or more externally positioned lights may diffuse through the balloon more efficiently, and thereby fully illuminating the entire surface of the display (2).

Referring again to FIG. 1, the balloon display (2) of the invention may be secured to one or more adaptors (3). In this preferred embodiment, the adaptor (3) of the invention may include an insert position (5) configured to be inserted into a support aperture (17) on a balloon display (2). In this embodiment, the support aperture (17) may include a reinforced support (not shown) positioned on the internal surface of the balloon display. In this embodiment, the support aperture (17) may include a hard-plastic, or other component that can be secured to the adaptor (2) of the invention, for example, through a threaded connection with the insert surface (5) of the adaptor (3). Placement of a support aperture (17) and reinforced support in a helium-free balloon through a rotational molding process has previously been described by Wicken et al, in U.S. Pat. No. 9,132,595B, and is incorporated herein by reference.

Referring again to FIGS. 1-3, the adaptor (3) of the invention may include an inflation port (6), and preferably an inflation port (6) that is integral with the adaptor (3). In this preferred embodiment, the integral inflation port (6) of the invention may include a channel in fluid communication with the external environment and the internal portion of the balloon display (2). A valve, such as a one-way valve, may be positioned within the channel of the inflation port (6) such that air from the external environment may be injected into the internal cavity of the balloon display (2) thereby inflating the object. The one-way valve of the inflation port (6) prevents the release of the injected air allowing the balloon display (2) to remain inflated.

The valve of the inflation port (6) may further adjustable, such that a user can open the valve to allow the balloon display (2) to be deflated. Alternatively, the adaptor (3) of the invention may be removed from the support aperture (17) thereby allowing air to escape the internal cavity of the balloon display (3), for example through an aperture in the reinforced support. As such, irrespective of the valve configuration, the integral inflation port (6) allows the balloon-display, and preferably a helium-free balloon display (2) to be inflated and deflated without having to disassemble the entire device as described below.

In alternative embodiments, the adaptor (3*a*) of the invention may include an insert surface (5) configured to be secured within the support aperture (17) of the balloon display (2) without an integral inflation port (6). In this alternative embodiment, a separate inflation aperture (7) may be presented on the helium-free balloon display (2) and may be further configured to allow inflation and deflation of the balloon display (2) using external air or other appropriate compressed or uncompressed gas. In this preferred embodiment, the separate inflation aperture (7) may be configured to be mated with the nozzle of an external air compressor and further be secured with a plug (8). This plug (8) may be removed to allow air to pass through the inflation aperture (7) thereby deflating the balloon display (2). In alternative embodiments, the inflation aperture (7) may include a valve configured to allow air to pass into the internal cavity of the balloon display (2) thereby inflating the object while preventing its release without the need for a plug (8). This valve may be activated by a user to allow escape of the air and deflation of the balloon display (2).

Figure 8:
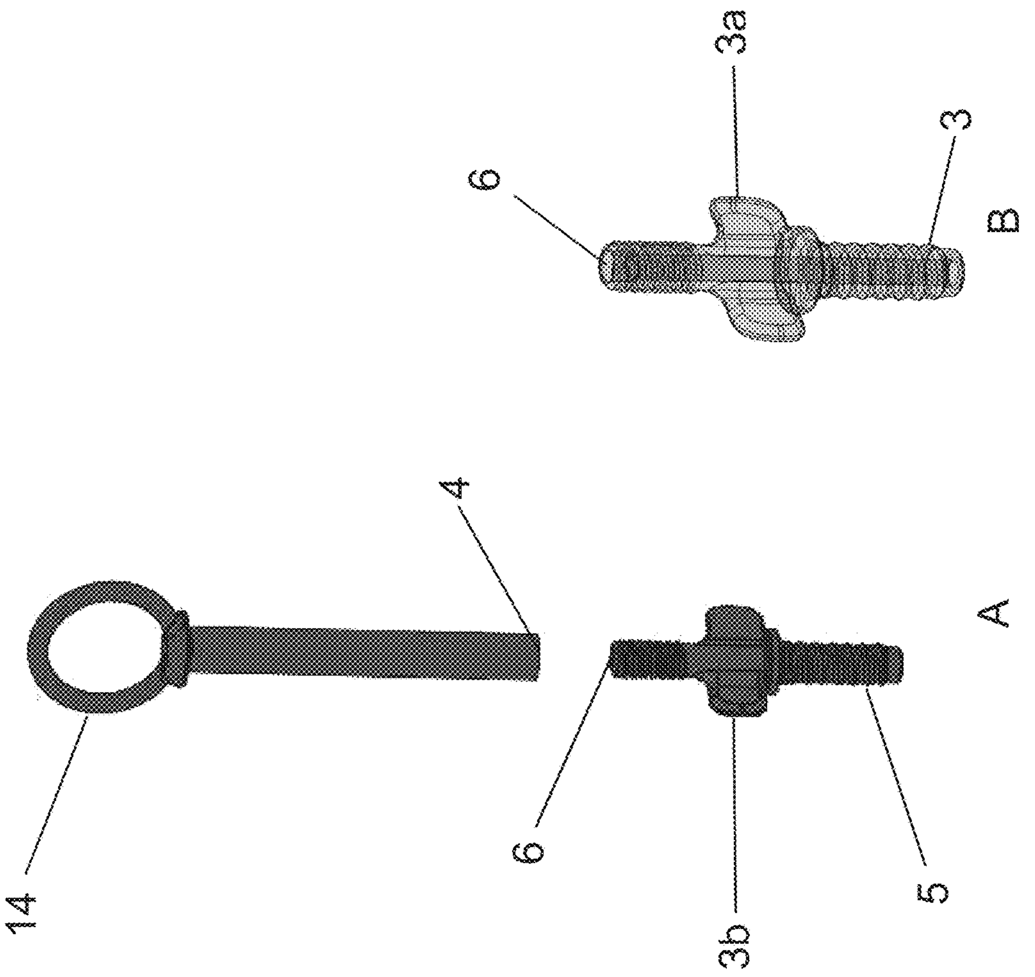
FIGS. 8A-B: shows an alternative embodiment of an adaptor having an internally positioned inflation port in one embodiment thereof.

Referring to FIG. 8, in still further alternative embodiments, the adaptor (3*b*) of the invention may include an inflation port (6), and preferably an inflation port (6) that is integral with the adaptor (3). In this preferred embodiment, the integral inflation port (6) of the invention may include a channel in fluid communication with the external environment and the internal portion of the balloon display (2). A valve, such as a one-way valve, may be positioned within the channel of the inflation port (6) such that air from the external environment may be injected into the internal cavity of the balloon display (2) thereby inflating the object. The one-way valve of the inflation port (6) prevents the release of the injected air allowing the balloon display (2) to remain inflated.

The one end of the adaptor (3*b*) can be configured to be secured to a coupler (14) which, in this embodiment acts as a plug to close the integral inflation port (6) of the invention. As shown in FIG. 8, this connection can be through a threaded connection, as well as alternative coupling systems such as a snap coupling, a slide coupling, a quick release coupling and the like. In this alternative embodiment, the adaptor (3*b*) can include an insert surface (5) configured to be coupled with a display, and preferably a balloon display (2). As also shown in FIG. 8, this connection can be through a threaded connection, as well as alternative coupling systems such as a snap coupling, a slide coupling, a quick release coupling and the like. In this preferred embodiment, the adaptor (3*b*) can include extension to facilitate the twisting motion of the components when secured with a balloon display (2)

The ornamental display system (1) of the invention may further include a lighting assembly (16) comprising, in one preferred embodiment, a platform (9) securing a plurality of light emitting diodes (LEDs) responsive to a controller (11), a power source (13), such as a battery, that is responsive to the LEDs (10) and optionally a housing which, as shown in the figures may provide the appearance of the top "cap" component of a "Christmas bauble" or ornament. In the preferred embodiment shown in FIG. 1, the lighting assembly (16) may also include a support (12) securing one or more solar panels (18) responsive to a power source (13), such as a battery.

Figure 2:
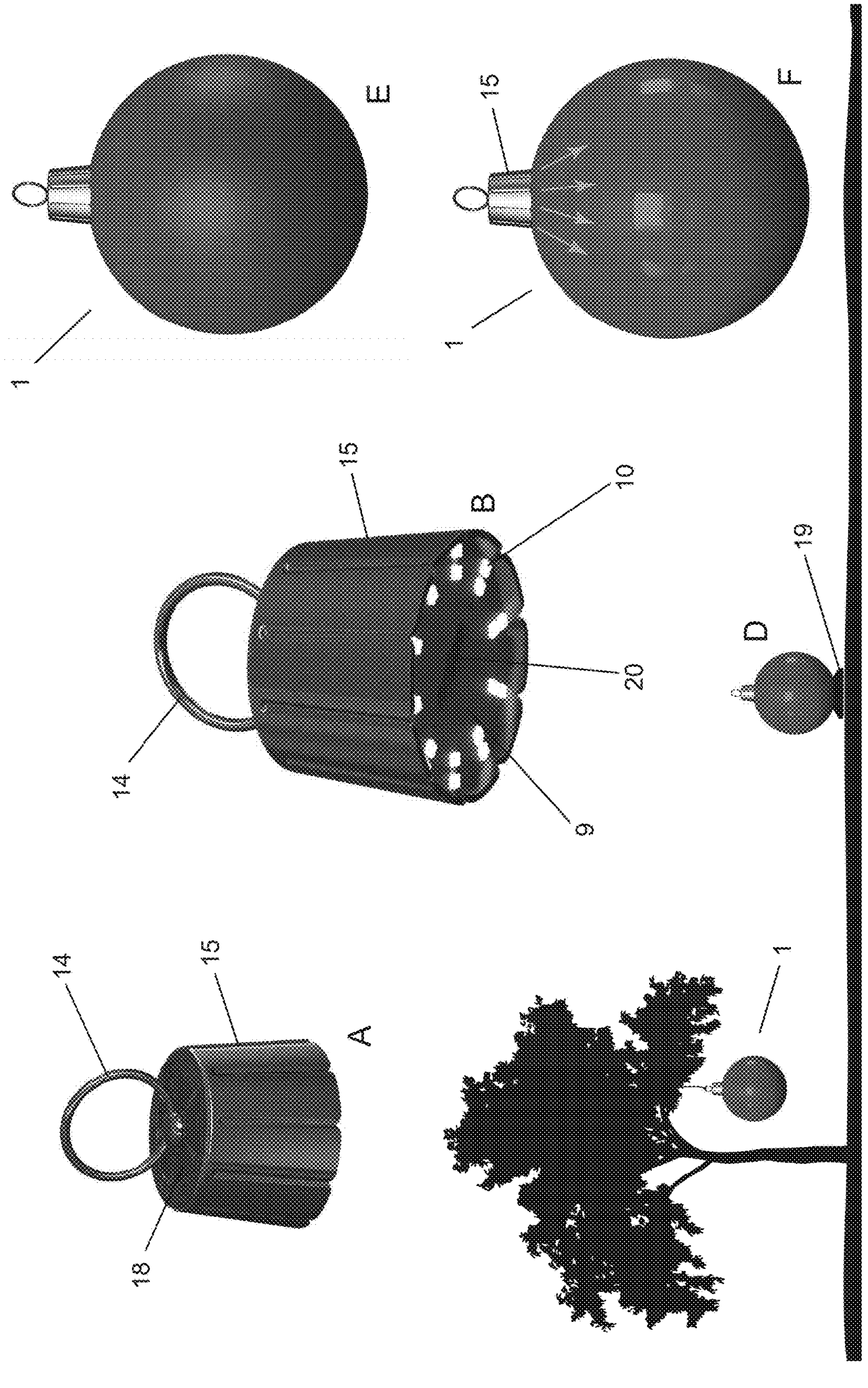
FIGS. 2A-F: shows an isolated view of a lighting assembly, and a fully-assembly ornamental display system in one embodiment thereof.
Figure 3:
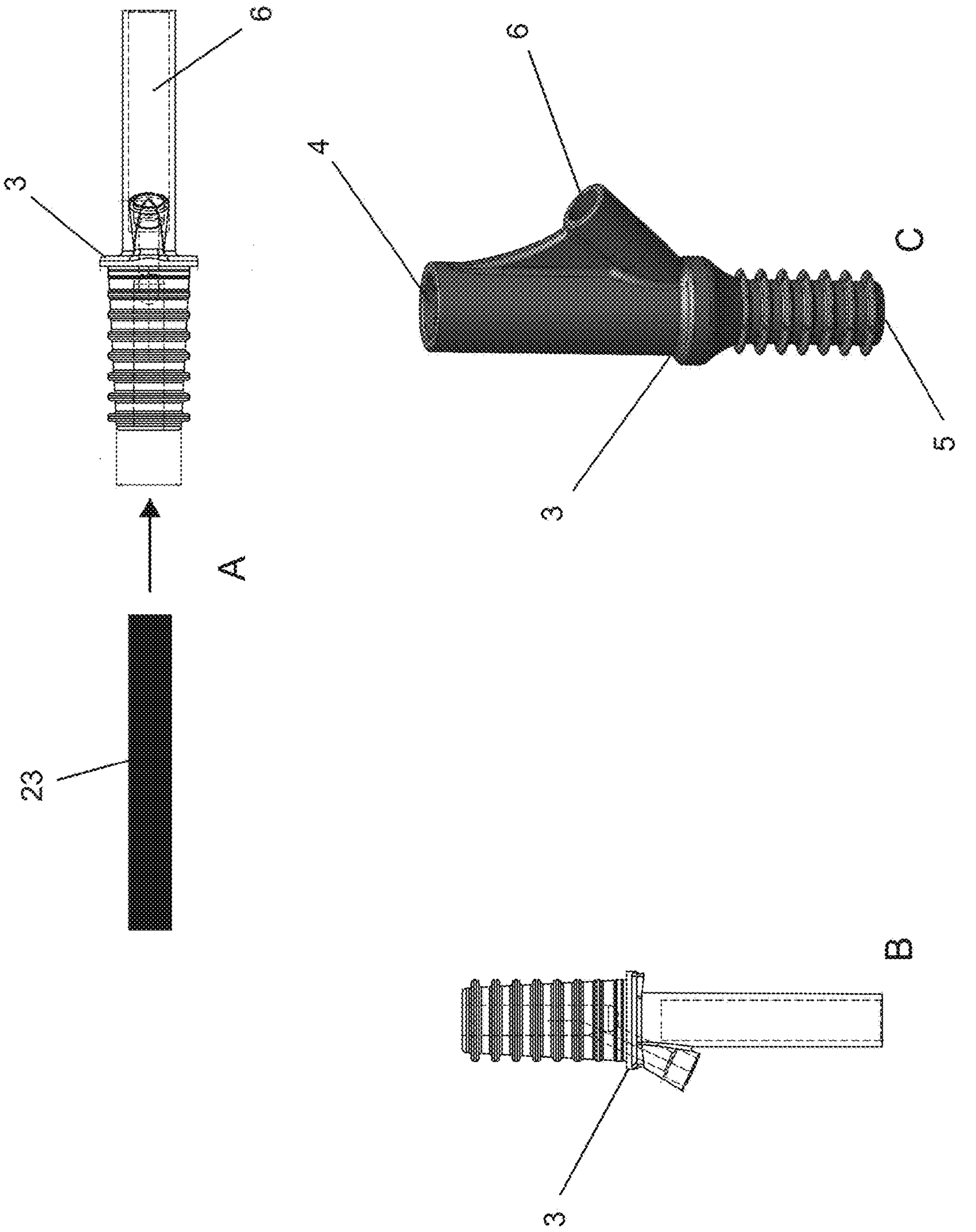
FIGS. 3A-C: shows an isolated view of an adaptor having an integral inflation port in one embodiment thereof.
Figure 4:
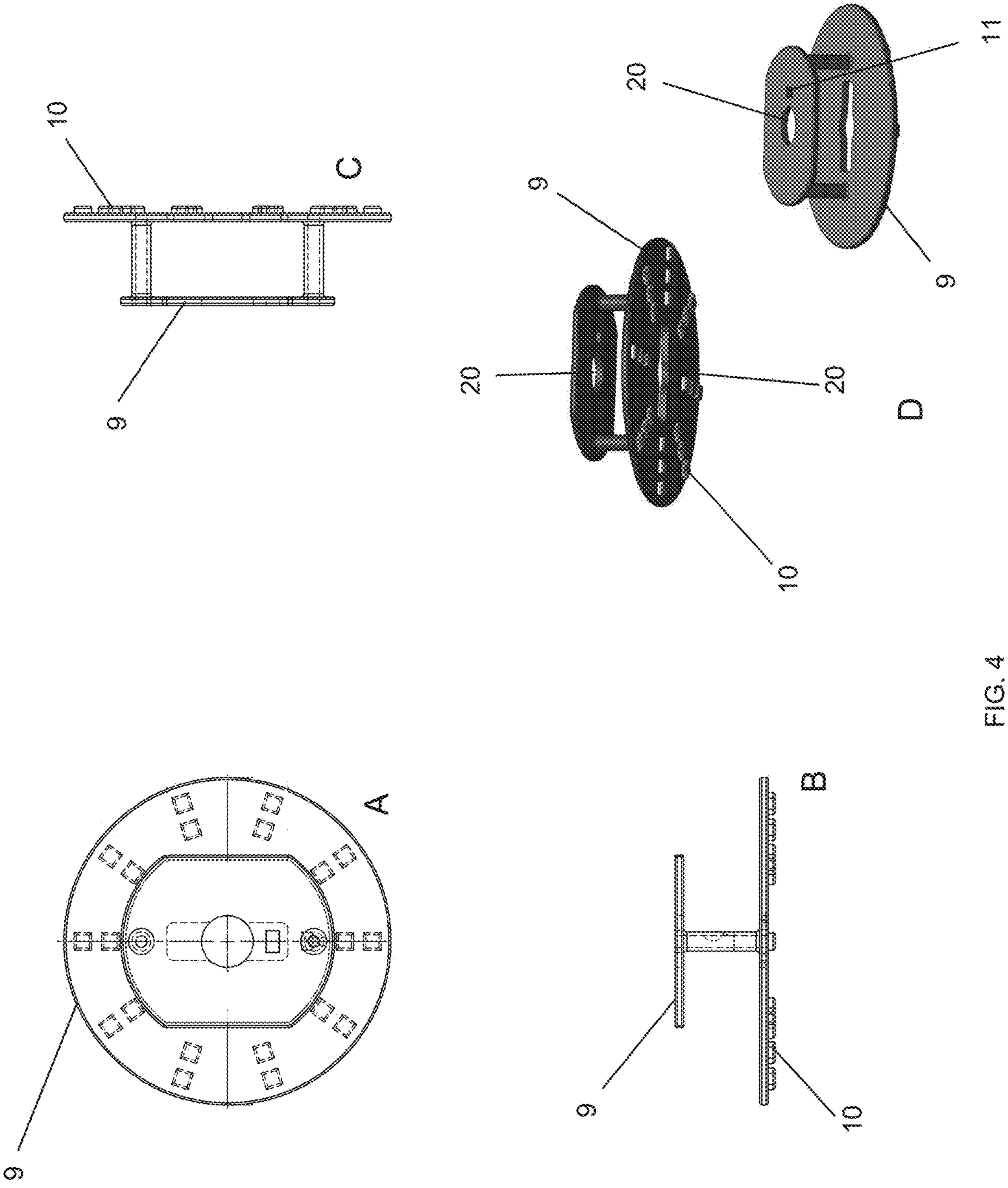
FIGS. 4A-D: shows an isolated view of a platform having a plurality of light emitting diode (LED) displays in one embodiment thereof.
Figure 5:
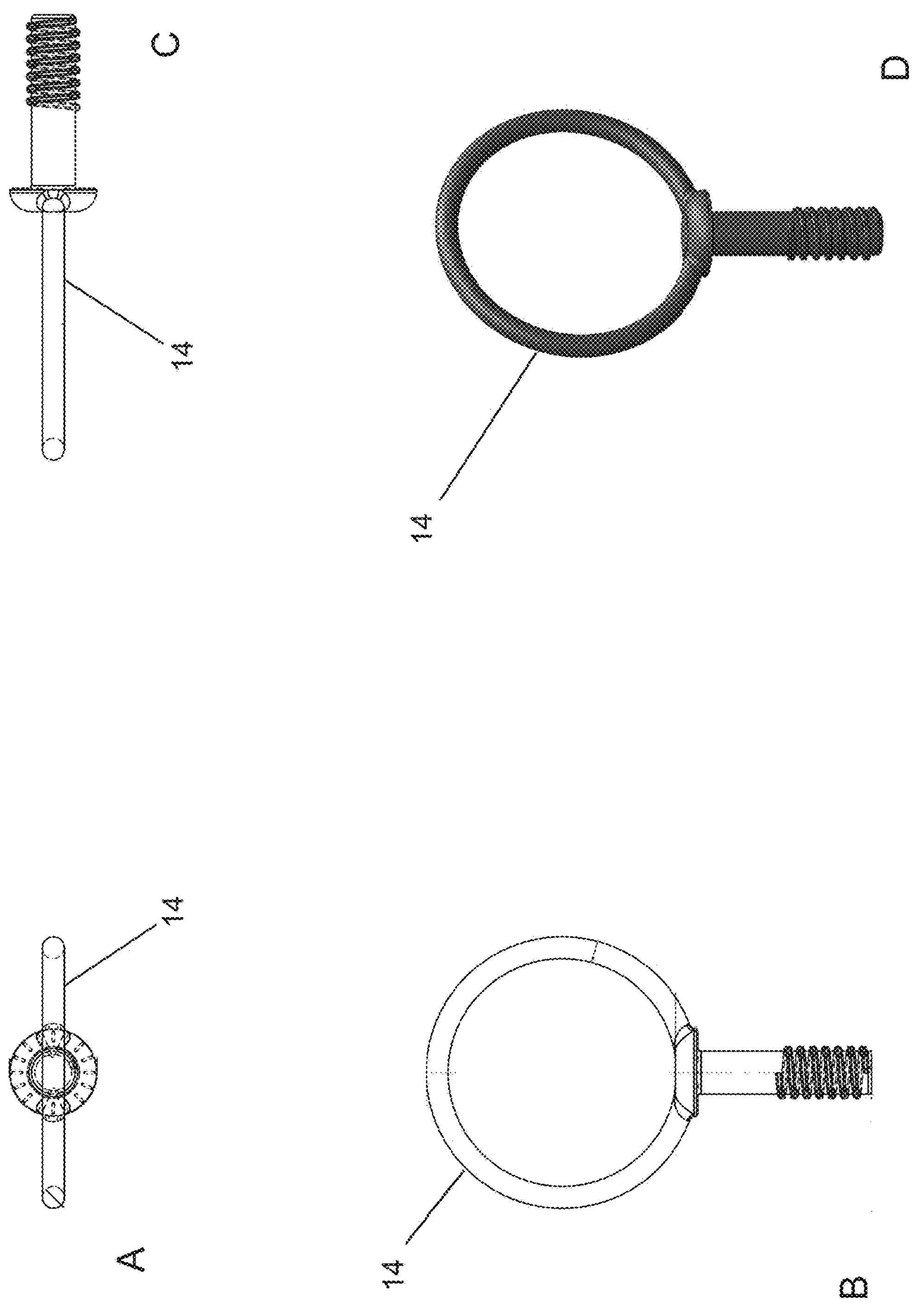
FIGS. 5A-D: shows an isolated view of a coupler in one embodiment thereof.
Figure 6:
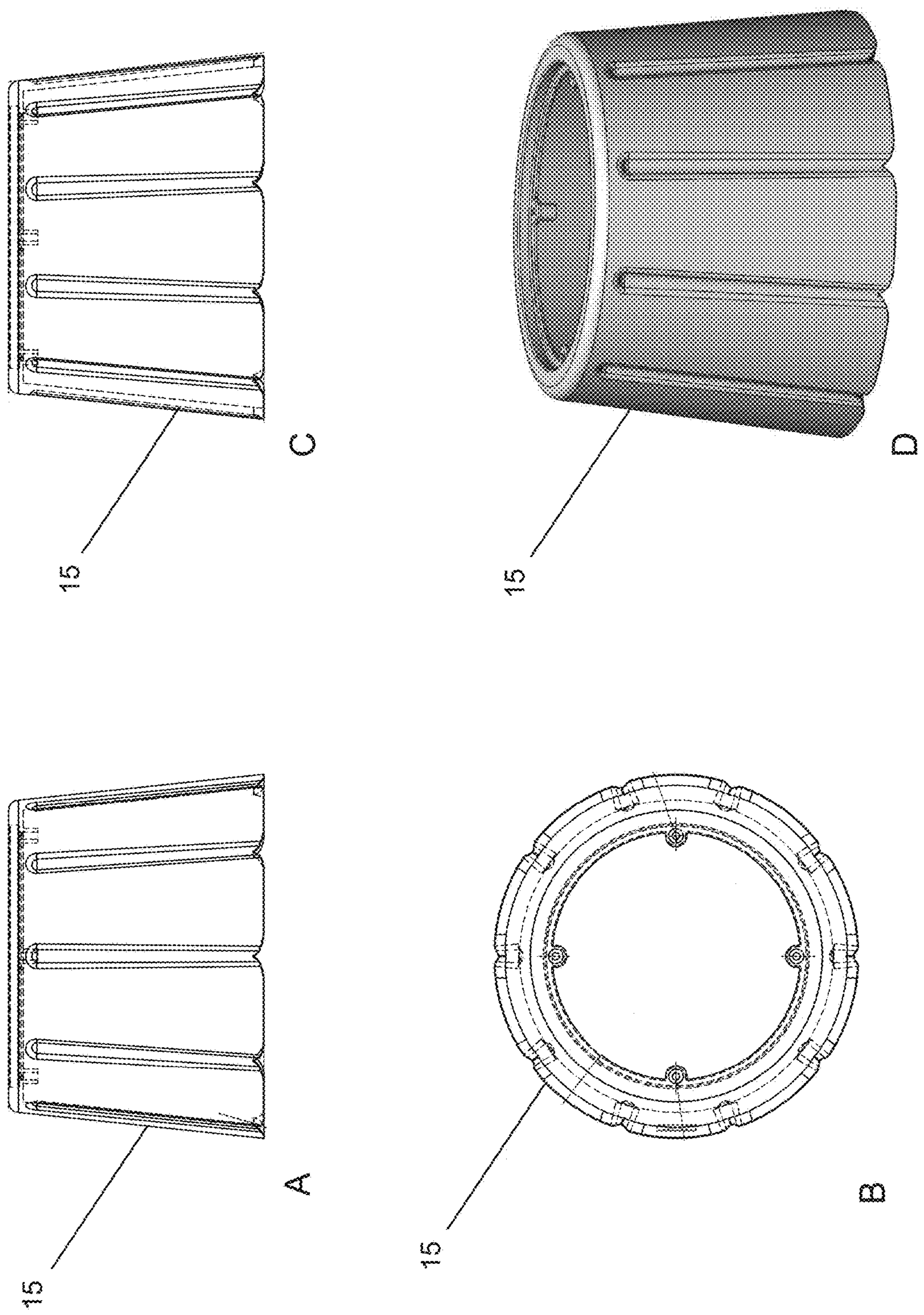
FIGS. 6A-D: shows an isolated view of a housing in one embodiment thereof.

As shown in FIGS. 1-2, and 4, the platform (9) of the invention may secure one or more light emitting diode (LEDs) (10), or similar lighting-emitting devices. As showing in FIG. 1, a plurality of LEDs (10) may be positioned along the bottom surface of the platform (9). When assembled, the platform (9) of the invention is positioned directly adjacent to the surface of the balloon-display (2) such that light from the LEDs (10) is projected into the top surface of the display (2) and allowed to diffuse through the external sidewalls of the display (2) as well as to be directed into the internal cavity of the display (2). In this configuration, the light from the LEDs (10) is allowed to diffuse through the entire balloon-display (2) providing a more consistent, uniform, and natural-appearing lighted display (2).

The support (12) of the invention may secure one or more solar panels (18). As shown in FIG. 1, a plurality of solar panels (18) may be positioned on the top surface of the support so as to be positioned to received sunlight. The solar panels (18) of the invention may be responsive to a power source (13), which may preferably include one or more batteries, or may directly power one or more LEDs (10) of the invention. In a preferred embodiment, the controller (11) of the invention may be responsive to the solar panels (18) and/or the power source (13) and the LEDs (10) of the invention. In this embodiment, the controller (11) may include a component, such as a printed circuit board (PCB). The controller (11) may turn on, or turn off the LEDs (10) in response to a signal from a user, such as the activation of an on-off switch, a remote control, a timer that can be set by a user to a specific time, or when energy is no-longer being generated by the solar panels (18) indicating that it is night-time. The controller (11) of the invention may further be programed to implement an executable function that may control the operation of the LEDs (10) of the invention. For example, the controller (11) of the invention may cause the LEDs (10) to blink, change color, fade in and out, pulse to sounds or movement or a combination of the same.

The housing (15) of the invention may be positioned over the support (12) and platform (9), and as noted above, may include external decorative designs that provide the appearance of the "cap" of a Christmas ornament. In this embodiment, the top surface of the housing (15) may be open allowing it to be positioned over the support (12) while not covering the solar panels (18). As shown in FIG. 2, the bottom surface of the housing (15) may extend below the bottom surface of the platform (9) securing the LEDs (10) and may further be configured to be positioned flush with the surface of the balloon display (2). In this configuration, the light emitted from the LEDs (10) is directed into the balloon display (2) and cannot "leak" out the sides of the lighting assembly (16). It should be noted that the housing (15) of the invention can include a variety of shapes and configurations depending on the desires of the user, as well as the corresponding shape or design of the balloon display (2).

Referring again to FIGS. 1-2, the lighting assembly (16) of the invention may be secured to the surface of the balloon display (2). In this preferred embodiment, the components of the lighting assembly (16) may include a central aperture (20) that can accommodate the connection of the coupler (14) and the adaptor (3) of the invention. In this embodiment, the platform (9) of the invention may be positioned over the adaptor (3) such that it is positioned approximately flush with the external surface of the balloon display (2). The housing (15) and support may be positioned over the platform (9) and may further include a central aperture (20). In the configuration, a coupler (14) may pass through the aligned central apertures (20) and be secured to the insert position (4) of the adaptor (3). In the preferred embodiment shown in FIG. 1, the coupler (14) of the invention may include a threaded portion that can be secured to the insert position (4) of the adaptor (3). In alternative embodiments, the coupler may include a snap, slide, beveled, fitted, twist or other appropriate coupler device configured to be secured to the insert position (4) of the adaptor (3). It should be noted that the lighting assembly (16) may be formed of multiple separable components, or a single unitary component as generally described herein.

As shown in FIG. 2, the coupler (14) of the invention may include a loop that allows the ornamental display system (1) to be hung from an elevated position with the a hook, or string. In alternative embodiments, the device can be placed on a stand support (19) to maintain the display at a single ground level location. In still further embodiments, an extension support (23) such as a pole or rod, and preferably a flexible rod, may be secured through the aligned central apertures (20) of the lighting assembly (16) so as to secure the assembly (16) to the balloon display (2). The pole or rod may be secured to an external surface through a stand support (19), or may be staked into the ground so as to present the balloon display (2) in an elevated position. In this embodiment provided herein, the balloon display (2) could be configured to have the appearance of a "geometric shape," "a lightbulb," a "pumpkin," a "cartoon character" and the like with the lighting assembly could be configured to have the appearance of a metal cap of a typical light-bulb. As detailed above, the "light bulb" display could be supported by an extension support (23) that is further secured to the group or other external surface, and illuminated by a lighting assembly (16) as described herein.

Figure 7:
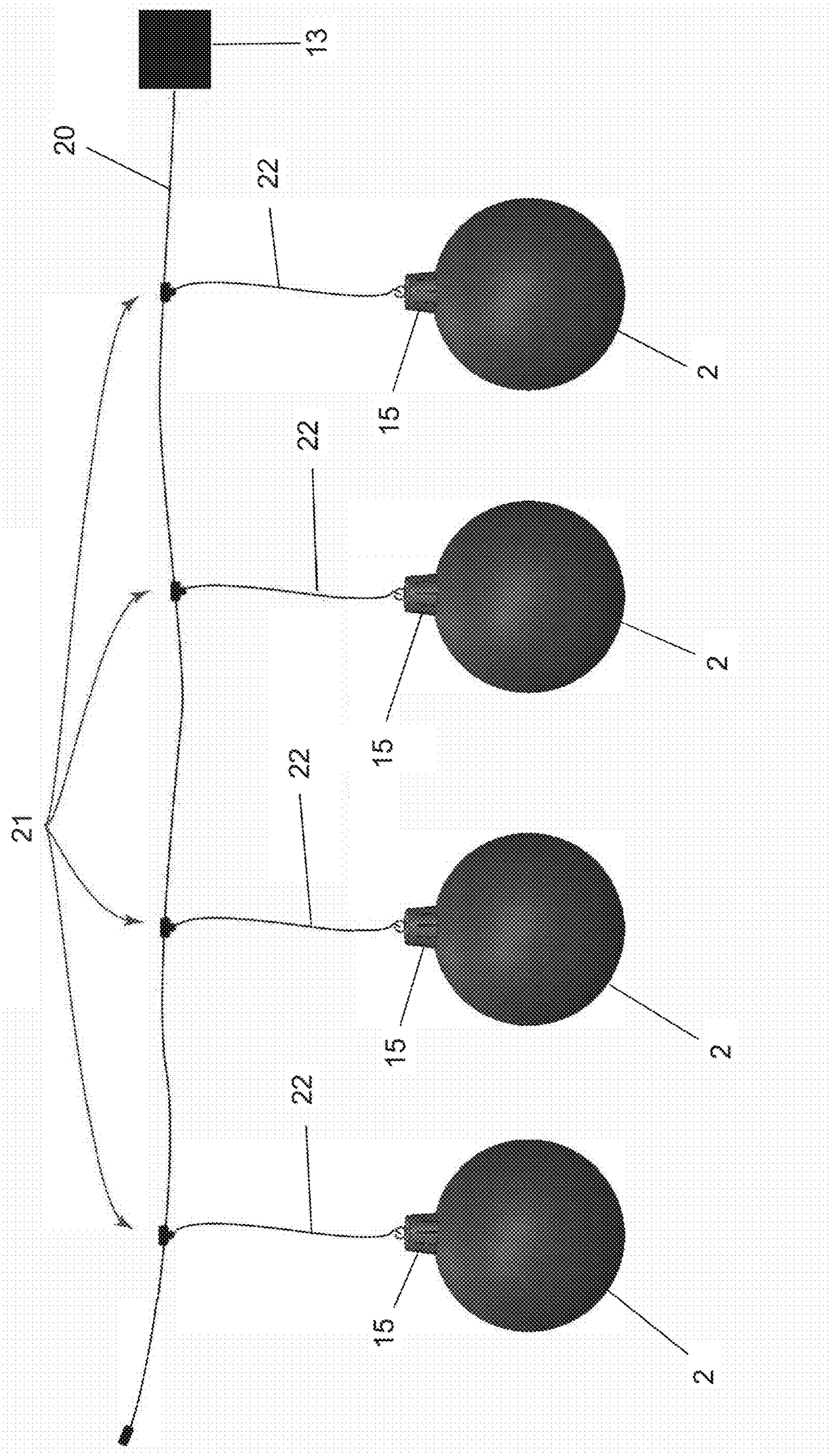
FIG. 7: shows a front view of a plurality of displays secured to a powered cord through a power adaptor that is responsive to a power source.

In one embodiment the ornamental display system (1) of the invention may include a wired power source (13) that is responsive to a light emitting diode (LED) (10) configured to illuminate a balloon display (2). Generally referring to FIG. 7, the invention may include a power source (13), which can be a wired power source such as an electrical outlet or electrical generator and the like. Electrical power from the power source (13) may be responsive to a controller (not shown), such as an on/off or dimmer switch, that can control the electrical output of the power source (13).

Again referring to FIG. 7, electrical power from the power source can be directed through a power cord (20). One or more ornamental display systems (1) may be secured along the power cord (20) at fixed or variable positions. In a preferred embodiment, a power adaptor (21) is coupled with the power cord (20) and further configured to transmit electrical power from the power source (13), through a power strand, to an light emitting diode (LED) (10) positioned within the housing (15).

As noted above, in a preferred embodiment, the power adaptor (21) can be positioned anywhere along the powered cord (20) forming an electrical connection and thereby energizing one or more LEDs (10) positioned within a housing (15). In alternative embodiment, the power adaptor (21) can be positioned at a fixed position having an electrical port (not shown) forming an electrically responsive connection when coupled with the adaptor (21). In this embodiment, a user can position one or more ornamental display systems (1) may be secured along the power cord (20) at fixed or variable positions for display. The power cord (20) can be secured to an external surface so that the ornamental displays (1) can hang vertically down from the powered cord (20), being secured by the length of the power strand (22). In alternative embodiments, the device can be placed on a stand support (19) to maintain the display at a single ground level location while being responsive to a power supply (13) as describe above.

In still further embodiments, an extension support (23) such as a pole or rod, and preferably a flexible rod, may be secured through the aligned central apertures (20) of the lighting assembly (16) so as to secure the assembly (16) to the balloon display (2) while being responsive to a power supply (13) as describe above. The pole or rod may be secured to an external surface through a stand support (19), or may be staked into the ground so as to present the balloon display (2) in an elevated position. The power cord (2) can be positioned along the ground, while a power strand (22) can be free, or configured to be coupled to the extension support (23), while in still further embodiment, the power strand (22) of the invention can be positioned inside an extension support (23) and of stand support (19) so as to be hidden from view. In another embodiment, the power strand (22) may be responsive to one or more LEDs (10) positioned within a housing (15) through an electrically responsive coupler (not shown). In this configuration, the power strand (22) can be separately connected and/or disconnected from the housing (15).

Figure 9:
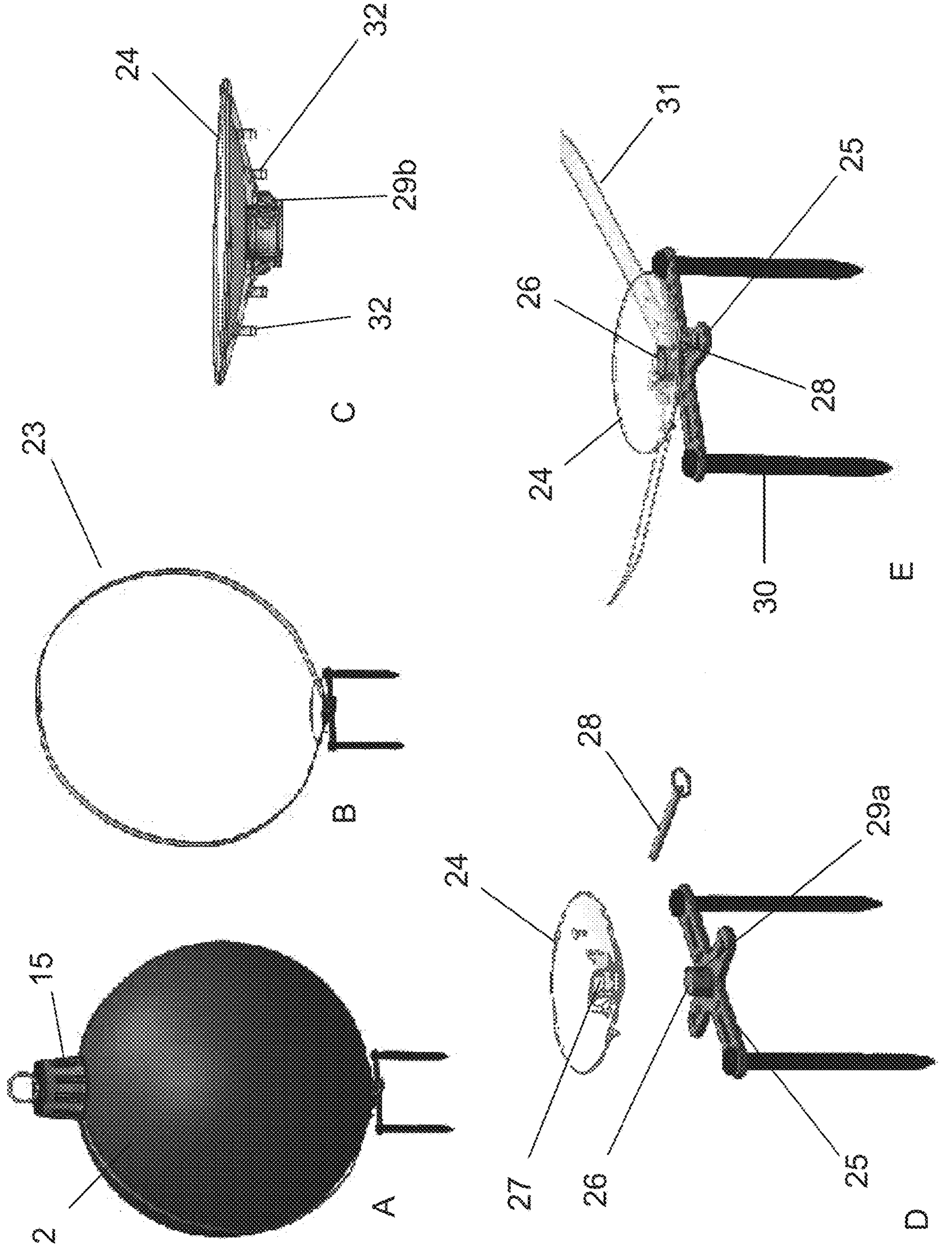
FIGS. 9A-E: show various embodiments of a display anchor assembly of the invention configured to secure an ornamental display to an external surface in one embodiment thereof.
Figure 10:
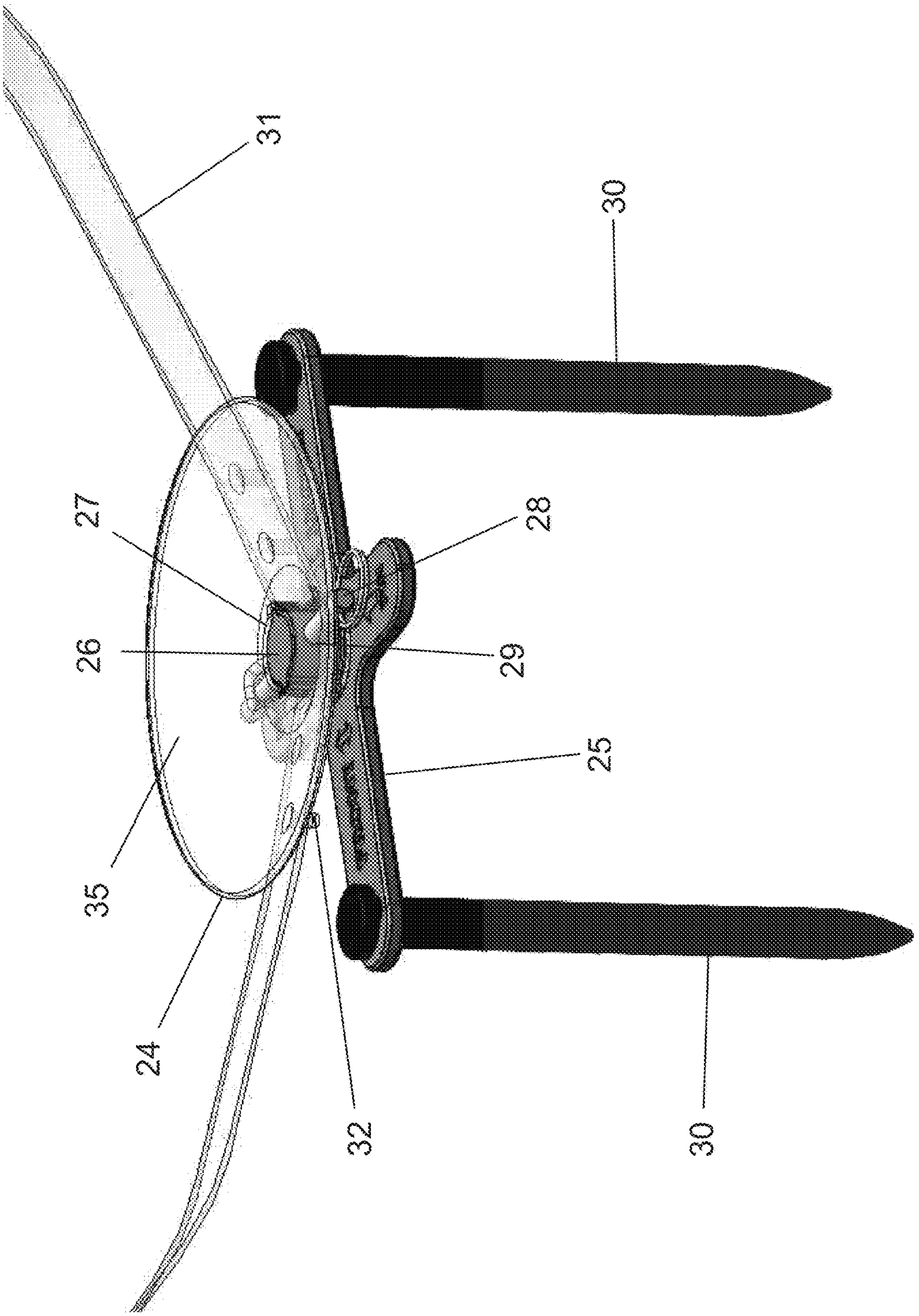
FIG. 10: shows a close-up view of a coupled display holder and platform display further including a plurality of stakes configured to secure the display anchor assembly to the ground or other surface in one embodiment thereof.
Figure 11:
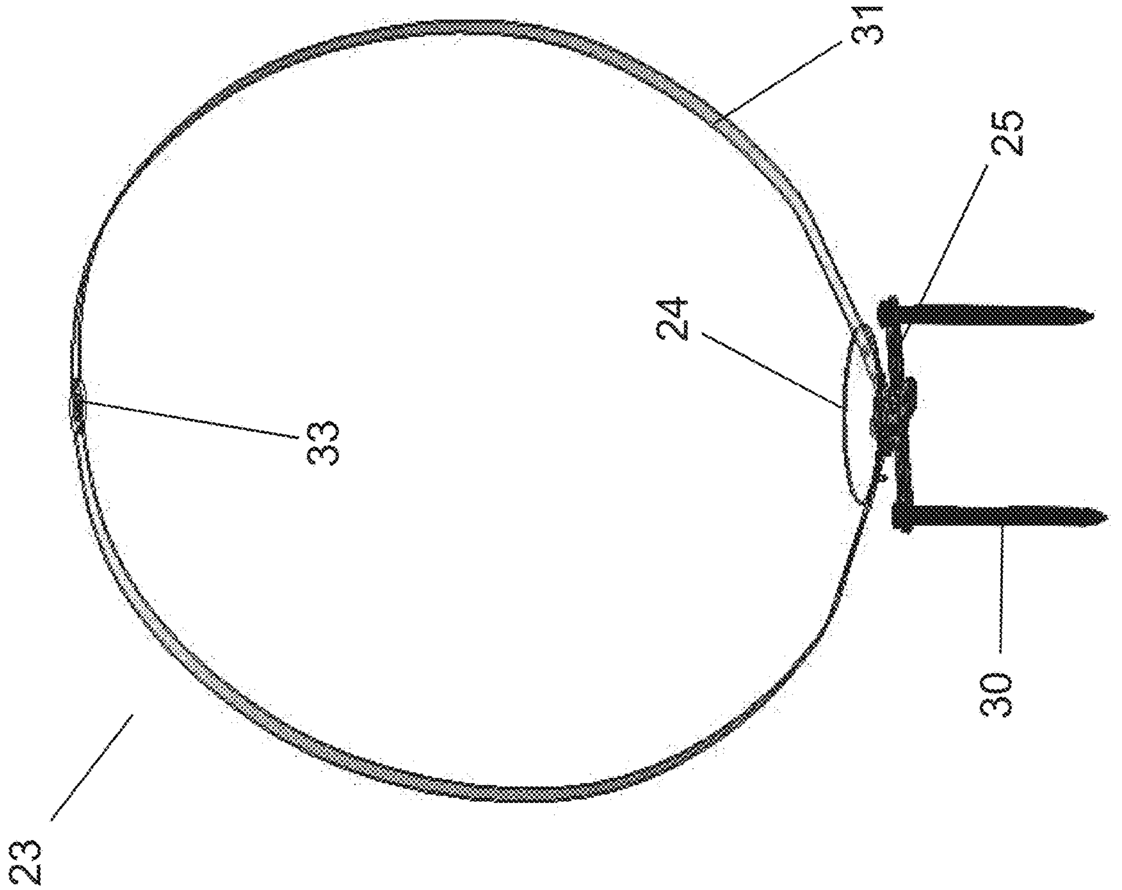
FIG. 11: shows a close-up view of a coupled display holder and platform display further securing a band configured to secure, in this embodiment a helium-free balloon within the display anchor assembly in one embodiment thereof.

In another preferred embodiment, the invention can include display anchor assembly (23). As shown in FIGS. 9-11, in this embodiment the display anchor assembly (23) may include a display holder (24). The display holder (24) of the invention may be configured to be positioned adjacent to and secure a display, and preferably a helium-free balloon display (2). In the preferred embodiment shown in FIG. 10, the display holder (24) of the invention can include an extended support surface (35) that forms a curved sup shape that matches the approximate contours of the helium-free balloon display (2) forming a flush surface connection between the two elements.

The display holder (24) of the invention may further be coupled with a platform (25). Again referring to FIG. 10, in one preferred embodiment, a display holder (24) includes a slot (27) configured to secure a corresponding attachment (26) on the platform (25). In the preferred embodiment shown in FIGS. 9-10, the slot (27) of the display holder (24) and attachment (26) of the platform (25) may include corresponding pin coupler (29*a*, 29*b*) positions. In this embodiment, the apertures of the pin coupler (29*a*, 29*b*) positions can be aligned and secured by inserting a pin (28). Naturally, alternative coupling device are contemplated within the scope of the invention, including, but not limited to slide couplers, snap couplers, fitter couplers slot couplers, beveled couplers and the like. Moreover, while shown as a coupling, in certain embodiments, the display holder (24) and platform (25) may be formed as an integral component.

Again referring to FIGS. 9 and 10, the platform (25) of the invention may include a planar or shaped surface configured to be positioned adjacent to an external surface, such as the group, a wall, a pole or other elevated surface. In this embodiment, the platform (25) of the invention is secured to the external surface, for example through a coupler, an adhesive, a magnet and the like. As shown in FIG. 10, in a preferred embodiment, one or more stakes (3) may be used to secured the platform (25) to the ground or other tractable surface. While the preferred embodiment of the invention shows the use of two stakes (3), and should not be limiting as to the number, type and position of stakes (3) or other securement devices.

The display anchor assembly (23) of the invention may further include a band (31) configured to secure a display, and preferably a helium-free balloon display (2) to a display holder (24) of the invention. As shown in FIG. 11, in one embodiment, a band (31) of the invention may include a flexible and/or rigid band (31) configured to be positioned adjacent to the a display, and preferably a helium-free balloon display (2) forming a secured connection around the balloon vertical circumference. As further shown in FIG. 11, the band (31) may be a single components, or include a linker (32) that can be adjusted to change the length of the band (31). Further, the band (31) of the invention can include a catch (32) which may be positioned along the top surface of the display, such that its aperture can be positioned over a support aperture (17) of the display. In this configuration, the adaptor (3) of the invention can pass through the catch (32) and be secured into the support aperture (17) of the display thereby securing the band (31) with the display (2) and housing assembly.

In alternative embodiment, the display anchor assembly (23) may further be configured to secure a display, and preferably a helium-free balloon display (2) to a display holder (24) of the invention. In one embodiment, a helium-free balloon display (2) of the invention may be secured to the display holder (24), for example through a coupler, adhesive or the like.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, and techniques as well as devices to accomplish an ornamental display system. In this application, the techniques, including novel and unique uses of manufacturing methods and materials, are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad apparatus, methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "coupler" should be understood to encompass disclosure of the act of "coupling"—whether explicitly discussed or not—and, conversely, were there effectively disclosure of the act of "coupling", such a disclosure should be understood to encompass disclosure of an "coupling method and/or technique, and or device" and even a "means for coupling." Such changes and alternative terms are to be understood to be explicitly included in the description.

Thus, the applicant(s) should be understood to have support to claim and make a statement of invention to at least: i) each of the methods, apparatus, improvements and/or devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage or considering if there has at any time been any possibility of an indication of disclaimer or surrender of potential coverage, should be aware that no such surrender or disclaimer is ever intended or ever exists in this or any subsequent application. Limitations such as arose in *Hakim* v. *Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An ornamental display comprising;

a display;

an adaptor secured within a support aperture of said display;

a lighting assembly secured to said adaptor comprising:

a platform securing a plurality of light emitting diodes (LEDs) responsive to a controller;

a power source responsive to said plurality of LEDs;

a housing securing said platform and said power supply; and a coupler securing said lighting assembly with said adaptor such that said plurality of LEDs are positioned adjacent to the surface of said display.

2. The display of claim 1, wherein said display comprises a helium-free balloon display.

3. The display of claim 2, wherein said helium-free balloon display further comprises an inflation aperture.

4. The display of claim 3, further comparing a plug configured to be secured in said inflation aperture.

5. The display of claim 1, wherein said adaptor comprises an integral inflation port.

6. The display of claim 5, wherein said adaptor comprises an insert position configured to secure said coupler.

7. The display of claim 1, wherein said adaptor comprises an insert surface configured to be secured in the support aperture of said balloon display.

8. The display of claim 1, wherein said power source comprises one or more solar panels responsive to said LEDs, and wherein said solar panels are secured in a support.

9. The displays of claim 1, wherein said power source comprises a battery.

10. The display of claim 1, wherein said insert position of the adaptor is secured to an extension support.

11. The display of claim 1, wherein said extension support comprises a pole or flexible rod.

12. The display of claim 1, further comprising a stand support configured to secure the display.

13. An solar-powered ornamental display comprising;

a helium-free display;

an adaptor secured within a support aperture of said helium-free display;

a lighting assembly secured to said adaptor comprising:

2 a platform securing a plurality of light emitting diodes (LEDs) responsive to a controller;

2 a power source responsive to said plurality of LEDs;

2 a support having one or more solar panels responsive to said power source;

2 a housing securing said platform and said support; and an extension support secured to said lighting assembly with said adaptor such that said plurality of LEDs are positioned adjacent to the surface of said helium-free display.

14. The display of claim 13, wherein said extension support comprises a pole or flexible rod.

15. The display of claim 13, further comprising a stand support.

16. An ornamental display assembly comprising;

a power source electrically responsive to a powered cord;

a power adaptor electrically responsive to said powered cord;

a power strand electrically responsive to said power adaptor;

a display;

a lighting assembly comprising a platform securing a plurality of light emitting diodes (LEDs) responsive to a controller and electrically responsive to said power strand.

17. The display assembly of claim 16, wherein said display comprises a helium-free balloon display.

18. The display of claim 13, further comprising a display anchor assembly configured to secure the helium-free display.

19. The display of claim 18, wherein said display anchor assembly comprises:

display holder secured to a platform; and a band secured to the display holder and configured to secure the helium-free display to the display holder.

20. The display of claim 18, further comprising one more stakes configured to secure the platform to the ground.

* * * * *